W. A. SLUSHER.
REVERSING GEARING.
APPLICATION FILED NOV. 30, 1908.
937,878.
Patented Oct. 26, 1909.
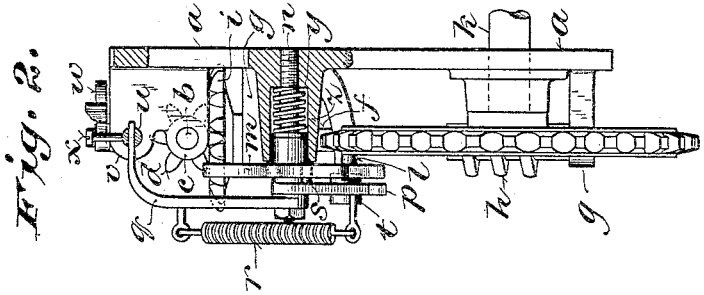
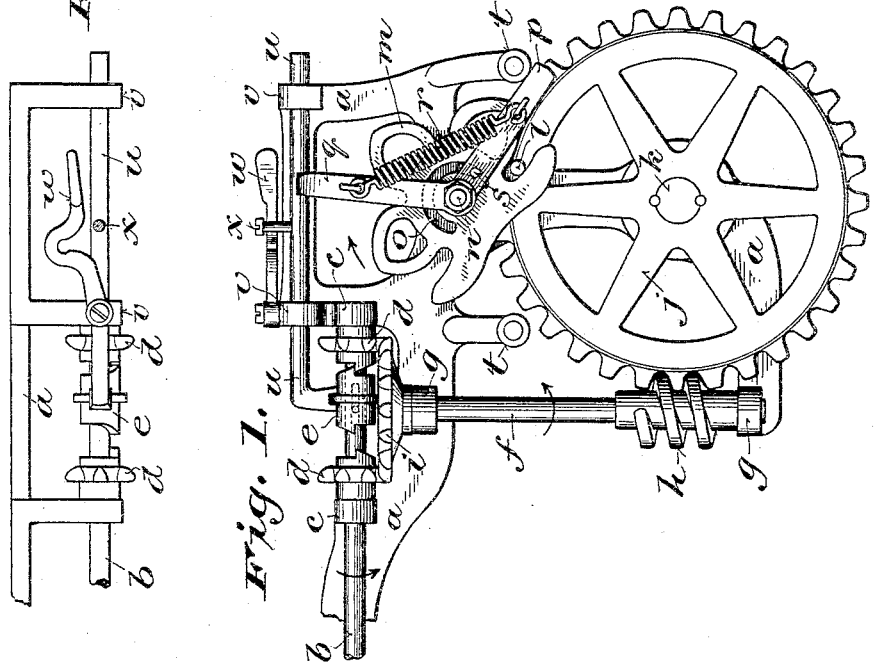
Witnesses:
Fred Palm
Chas. L. Cross.
Inventor:
Walter A. Slusher,
By Franklin Flanders & Wilhelm Fausch
Attorneys.

UNITED STATES PATENT OFFICE.

WALTER A. SLUSHER, OF INDEPENDENCE, KANSAS.

REVERSING-GEARING.

937,878. Specification of Letters Patent. Patented Oct. 26, 1909.

Application filed November 30, 1908. Serial No. 465,350.

*To all whom it may concern:*

Be it known that I, WALTER A. SLUSHER, a citizen of the United States, residing at Independence, in the county of Montgomery and State of Kansas, have invented certain new and useful Improvements in Reversing-Gearing, of which the following is a specification, reference being had to the accompanying drawing, forming a part thereof.

This invention relates more particularly to reversing gearing for washing and other machines in which it may be desirable to convert rotary motion in one direction into an oscillatory or rotary movement in opposite directions.

The main objects of the invention are to periodically and automatically reverse the direction of movement of a rotary or oscillatory member of a machine, and generally to improve the construction and operation of gearing for this purpose.

It consists in the peculiar construction, arrangement and combination of parts as hereinafter particularly described and pointed out in the claims.

In the accompanying drawing like characters designate the same parts in the several figures.

Figure 1 is a front elevation of reversing gearing embodying the invention as designed for use in a washing machine or the like; Fig. 2 is a side elevation and partial vertical section as viewed from the right with relation to Fig. 1; and Fig. 3 is a partial plan view showing the detent or cut-out for rendering the reversing gearing inoperative.

In the practical embodiment of the invention the shifting mechanism may be connected with a clutch as shown, or with any other device by which rotary motion in a single direction is converted into an oscillatory movement or alternating rotary movement in opposite directions.

For application to washing machines and the like, the mechanism is preferably mounted as a unit on a base plate or bracket $a$, which is formed or provided with suitable bearings for the moving parts. A driving shaft $b$ having bearings $c$ on the plate $a$, is provided between said bearings with loose pinions $d$ and an intermediate clutch sleeve or member $e$, movable endwise into engagement with the opposing tooth or clutch member on the hub of either pinion. A driven shaft $f$ supported by bearings $g$ on the plate $a$ at right angles to the shaft $b$, is provided with a worm $h$ and with a gear $i$ which constantly meshes on opposite sides with the pinions $d$. A reversing wheel or worm gear $j$ mounted on a shaft $k$ in engagement with the worm $h$, is provided with a pin or tooth $l$. A notched segmental rocker $m$ pivoted in a plane parallel with that of the gear $j$ on a stud $n$ projecting from the plate $a$, is formed with a curved or arcuate slot $o$ concentric with said stud.

Two shifting arms $p$ and $q$ are pivoted on the stud $n$ next to the outer face of the rocker $m$ and are connected by a spring $r$ which tends to draw them together or swing them toward each other. The arm $p$ is provided with a pin or projection $s$ which extends into the slot $o$. The movement of the arm $p$ is limited in opposite directions by stops $t$ which project outwardly from the plate $a$ and may be covered with rubber or other suitable material as shown, to prevent shock and noise when they are struck by the arm $p$.

A sliding bar or rod $u$ movable endwise in bearings $v$ on the plate $a$ and bent and grooved or forked at one end to engage with a peripheral rib on the clutch sleeve $e$, is loosely connected between its bearings with the rearwardly bent upper end of the arm $q$. A latch or detent $w$, pivoted to one of the bearings $v$ is adapted by engagement with a pin or projection $x$ on the bar $u$ to lock and hold the clutch sleeve or member $e$ in its middle position out of operative relation to the clutch teeth or members on the pinions $d$.

A spiral spring $y$ inserted in a socket or hollow boss $z$ on the plate $a$ around the stud $n$, presses against the hub of the rocker $m$ and acts as a friction brake to prevent accidental movement or displacement of the rocker by the jarring of the machine or otherwise.

In the operation of the device the shaft $b$ being rotated in the direction indicated by the arrow thereon in Fig. 1, and the clutch member $e$ being in engagement with the pinion $d$ at the right, the gear $j$ will be turned to the left as indicated by an arrow, and by the engagement of the pin or tooth $l$ with the notches in the rocker $m$ will intermittently turn said rocker to the right. As the tooth $l$ toward the end of the third revolution of the gear $j$ in this direction, engaging with the last notch in the rocker $m$, turns said rocker the last interval to the right, the following end of the slot $o$ engaging with the pin $s$, swings the arm $p$ to the left into and past alinement with the arm $q$, whereupon the spring $r$ instantly throwing the arm $p$ against the stop $t$ at the left, swings the arm $q$ also to the left and shifts the clutch member $e$ from engagement with the pinion $d$ at the right, into engagement with the pinion $d$ at the left, thereby instantly reversing the driven shaft $f$ and hence the reversing wheel $j$. The wheel $j$ being now turned to the right will by engagement of its tooth $l$ with the notches in the rocker $m$ in the reverse direction, intermittently turn said rocker back to the left, until toward the end of the third revolution of said gear the rocker, turning its last interval to the left, picks up the arm $p$, swinging it back to the right into and past alinement with the arm $q$. The arm $q$ being thereupon drawn by the spring $r$ back to the right, instantly shifts the clutch member $e$ back into engagement with the pinion $d$ at the right, again reversing the rotation of the driven shaft $f$ and the gear $j$. These operations being repeated as above explained, the gear or wheel $j$ with its shaft $k$ on which the rotary cylinder or other part of a washing or other machine may be mounted, is turned alternately three revolutions in one direction, then reversed and turned three revolutions in the opposite direction, and so on as long as the shifting bar or rod $u$ is free and operative.

Whenever it is desired to temporarily stop the machine or the movement of the part mounted on or connected with the shaft $k$ without stopping the motor or driving shaft $b$, the latch or detent $w$ is turned into engagement with the pin $x$ on the shifting bar $u$, thereby locking and holding the clutch member $e$ in inoperative position between and out of engagement with the pinions $d$.

Various changes in the details of construction and arrangement of parts may be made without departure from the principle and scope of the invention.

I claim:

1. In reversing gearing the combination of pivotally connected shifting arms, a spring tending to swing said arms toward each other, stops for limiting the movement of one arm, a rocker capable of a limited movement independently of said arm and adapted as it approaches the limits of its movement to engage with and swing said arm in opposite directions into and past alinement with the other arm, and a reversing wheel adapted to turn said rocker in opposite directions.

2. In reversing gearing the combination of pivotally connected shifting arms, a spring tending to swing said arms toward each other when they are carried past alinement in either direction, stops for limiting the movement of one arm, a notched segmental rocker adapted by its final movement in each direction to swing said arm into and past alinement with the other arm, and a reversing wheel having a tooth arranged to intermittently turn said rocker by engagement with the notches therein.

3. In reversing gearing the combination of pivotally connected shifting arms, a spring tending to swing said arms toward each other when they are carried past alinement in either direction, stops for limiting the movement of one arm, a rocker adapted by its final movement in each direction to swing said arm into and past alinement with the other arm, a brake acting on said rocker to prevent accidental displacement thereof, and a reversing wheel adapted to intermittently turn said rocker in opposite directions.

4. In reversing gearing the combination of pivotally connected shifting arms, a spring connecting said arms and tending to swing them toward each other, stops for limiting the movement of one arm, a rocker having its axis concentric with the pivot connection of said arms, and an arcuate slot arranged to engage at the ends with a projection on said arm and a reversing wheel adapted to turn said rocker alternately in opposite directions.

5. In reversing gearing the combination with shafts arranged at an angle to each other, a gear fixed on one shaft, pinions loosely mounted on the other shaft in mesh with said gear, and a clutch member movable into engagement with either of said pinions, of pivotally connected shifting arms one of which is connected with said clutch member, stops for limiting the movement of the other arm, a spring tending to swing said arms toward each other, a rocker adapted as it approaches the limits of its movement to swing said arm in opposite directions, and a reversing wheel adapted to turn said rocker in opposite directions.

6. In reversing gearing the combination with a reversing clutch of pivotally connected shifting arms one of which is connected with said clutch, stops for limiting the movement of the other arm, a spring tending to swing said arms toward each other, a rocker adapted as it approaches the limits of its movement to swing the stop limited arm in opposite directions into and past alinement with the other arm, a reversing wheel adapted to turn said rocker in opposite directions, and a detent for holding said clutch member in inoperative position.

7. In reversing gearing the combination of a driving shaft, pinions loosely mounted thereon, a clutch member movable into engagement with either pinion, a driven shaft, a gear thereon meshing on opposite sides thereof with said pinions, a worm on said driven shaft, a worm gear engaging said worm and provided with a tooth, a notched segmental rocker adapted to be turned intermittently in opposite directions by the engagement of the tooth on the worm gear with the notches in the rocker and having a concentric arcuate slot, shifting arms pivotally connected with each other concentric with said rocker, stops for limiting the movement of one of said arms which has a projection working in said slot, the other arm being connected with said clutch member, and a spring connecting said arms and tending to draw them toward each other.

In witness whereof I hereto affix my signature in presence of two witnesses.

WALTER A. SLUSHER.

Witnesses:
 D. A. FRAZEE,
 W. C. BROWN.